(12) United States Patent
Nagao et al.

(10) Patent No.: US 7,854,286 B2
(45) Date of Patent: Dec. 21, 2010

(54) MOTORCYCLE HAVING CONCEALED BRAKE CALIPER

(75) Inventors: Daisuke Nagao, Long Beach, CA (US); Kenji Tamura, Redondo Beach, CA (US)

(73) Assignee: Honda Motor Company, Ltd. (JP)

( * ) Notice: Subject to any disclaimer, the term of this patent is extended or adjusted under 35 U.S.C. 154(b) by 158 days.

(21) Appl. No.: 12/254,874

(22) Filed: Oct. 21, 2008

(65) Prior Publication Data

US 2010/0096225 A1   Apr. 22, 2010

(51) Int. Cl.
*B62D 61/02* (2006.01)
(52) U.S. Cl. .................. 180/219; 180/227; 280/276; 188/26
(58) Field of Classification Search ............. 180/219, 180/227; 280/276, 279; 188/26, 344
See application file for complete search history.

(56) References Cited

U.S. PATENT DOCUMENTS

| | | | |
|---|---|---|---|
| 3,709,561 A | 1/1973 | De Biasse et al. | |
| 4,120,536 A | 10/1978 | Bernardi | |
| 4,488,761 A | 12/1984 | Buell | |
| 4,660,683 A | 4/1987 | Hayashi et al. | |
| 4,662,482 A | 5/1987 | Bass | |
| 4,716,993 A | 1/1988 | Bass | |
| 4,732,241 A | 3/1988 | Yoshida | |
| 4,989,696 A | 2/1991 | Buell | |
| 5,014,808 A | 5/1991 | Savard et al. | |
| 5,092,421 A | 3/1992 | Tsurumaki et al. | |
| 5,732,798 A | 3/1998 | Toson | |
| 6,126,242 A | 10/2000 | Chen | |
| 6,516,910 B2 | 2/2003 | Buell et al. | |
| 6,561,298 B2 | 5/2003 | Buell et al. | |
| 6,672,419 B2 | 1/2004 | Buell et al. | |
| 6,733,089 B1 * | 5/2004 | Wakabayashi et al. | 303/9.64 |
| 6,773,077 B2 | 8/2004 | Buell et al. | |
| 6,923,293 B1 | 8/2005 | James | |
| 6,966,571 B2 | 11/2005 | Czysz | |
| 7,007,778 B2 | 3/2006 | Lavezzi | |
| 7,028,818 B1 | 4/2006 | James | |
| 7,055,655 B2 * | 6/2006 | Takizawa et al. | 188/24.19 |
| 7,066,556 B2 * | 6/2006 | Irie | 301/6.9 |
| 7,484,600 B2 * | 2/2009 | Watarai | 188/26 |
| 2003/0188931 A1 * | 10/2003 | LaBrash et al. | 188/26 |
| 2005/0242545 A1 * | 11/2005 | Czysz | 280/276 |
| 2006/0138744 A1 * | 6/2006 | Namazue et al. | 280/276 |
| 2006/0185942 A1 | 8/2006 | Costa | |
| 2006/0185944 A1 | 8/2006 | Costa | |
| 2008/0179125 A1 * | 7/2008 | Glover | 180/227 |
| 2008/0245632 A1 * | 10/2008 | Watarai et al. | 188/344 |
| 2010/0071985 A1 * | 3/2010 | Harada | 180/219 |

* cited by examiner

*Primary Examiner*—Lesley Morris
*Assistant Examiner*—Tashiana Adams
(74) *Attorney, Agent, or Firm*—Ulmer & Berne LLP

(57) ABSTRACT

A motorcycle includes a wheel support member, a wheel, and a brake caliper. The wheel support member has a wheel mount portion. The wheel is rotatably attached to the wheel mount portion. The brake caliper is attached to the wheel support member at a location spaced from the wheel mount portion such that the brake caliper is at least substantially concealed from view by the wheel support member when the motorcycle is viewed in a direction from the wheel support member to the wheel along a rotational axis of the wheel.

12 Claims, 3 Drawing Sheets

MOTORCYCLE HAVING CONCEALED BRAKE CALIPER

TECHNICAL FIELD

A motorcycle has a brake caliper which is attached to a wheel support member of the motorcycle.

BACKGROUND

Many conventional motorcycles have a front fork including telescoping fork members which support a front wheel of the motorcycle. In such an arrangement, it is common for a brake caliper to be attached to a lowermost fork member for interaction with a brake disc attached to the front wheel. While generally effective to facilitate braking of the motorcycle, this arrangement provides significant bulk in the vicinity of the wheel's hub and, as a result, among other disadvantages, detracts from the aesthetic styling of the motorcycle.

SUMMARY

In accordance with one embodiment, a motorcycle comprises a frame, a front fork assembly, a front wheel, and a brake caliper. The front fork assembly is supported with respect to the frame and includes a first fork member and a second fork member. The first fork member comprises a first inner surface and a first wheel mount portion. The second fork member comprises a second inner surface and a second wheel mount portion. The first inner surface faces the second inner surface in a spaced relationship to create a channel. The front wheel comprises a hub and a rim attached to the hub. The hub is rotatably attached to each of the first and second wheel mount portions such that the front fork assembly straddles the front wheel. The brake caliper is positioned within the channel. The brake caliper is at least substantially concealed from view by the front fork assembly when the motorcycle is viewed in either direction from one of the first and second fork members to the front wheel along a rotational axis of the front wheel.

In accordance with another embodiment, a motorcycle comprises a frame, a front fork assembly, a front wheel, a brake caliper, a handlebar, and a hand lever. The front fork assembly is supported with respect to the frame and includes a first fork member and a second fork member. The first fork member comprises a first inner surface and a first wheel mount portion. The second fork member comprises a second inner surface and a second wheel mount portion. The first inner surface faces the second inner surface in a spaced relationship to create a channel. The front wheel comprises a hub, a rim, and a tire. The rim is attached to the hub. The tire is attached to the rim about an outer periphery of the rim. The hub is rotatably attached to each of the first and second wheel mount portions such that the front fork assembly straddles the front wheel. The brake caliper is attached to the first inner surface of the first fork member at a location spaced from the first wheel mount portion such that the brake caliper resides entirely within the channel. The brake caliper is concealed from view by the front fork assembly when the motorcycle is viewed in either direction from one of the first and second fork members to the front wheel alone a rotational axis of the front wheel. The handlebar is supported with respect to the frame and is configured to facilitate steering of the front fork assembly by an operator. The hand lever is attached to the handlebar and is configured for use by an operator to control the brake caliper.

In accordance with yet another embodiment, a motorcycle comprises a wheel support member, a wheel, and a brake caliper. The wheel support member comprises an inner surface and a wheel mount portion. The wheel comprises a hub and a rim attached to the hub. The hub is rotatably attached to the wheel mount portion such that the inner surface of the wheel support member faces the wheel. The brake caliper is attached to the inner surface of the wheel support member at a location spaced from the wheel mount portion such that the brake caliper is at least substantially concealed from view by the wheel support member when the motorcycle is viewed in a direction from the wheel support member to the wheel along a rotational axis of the wheel.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
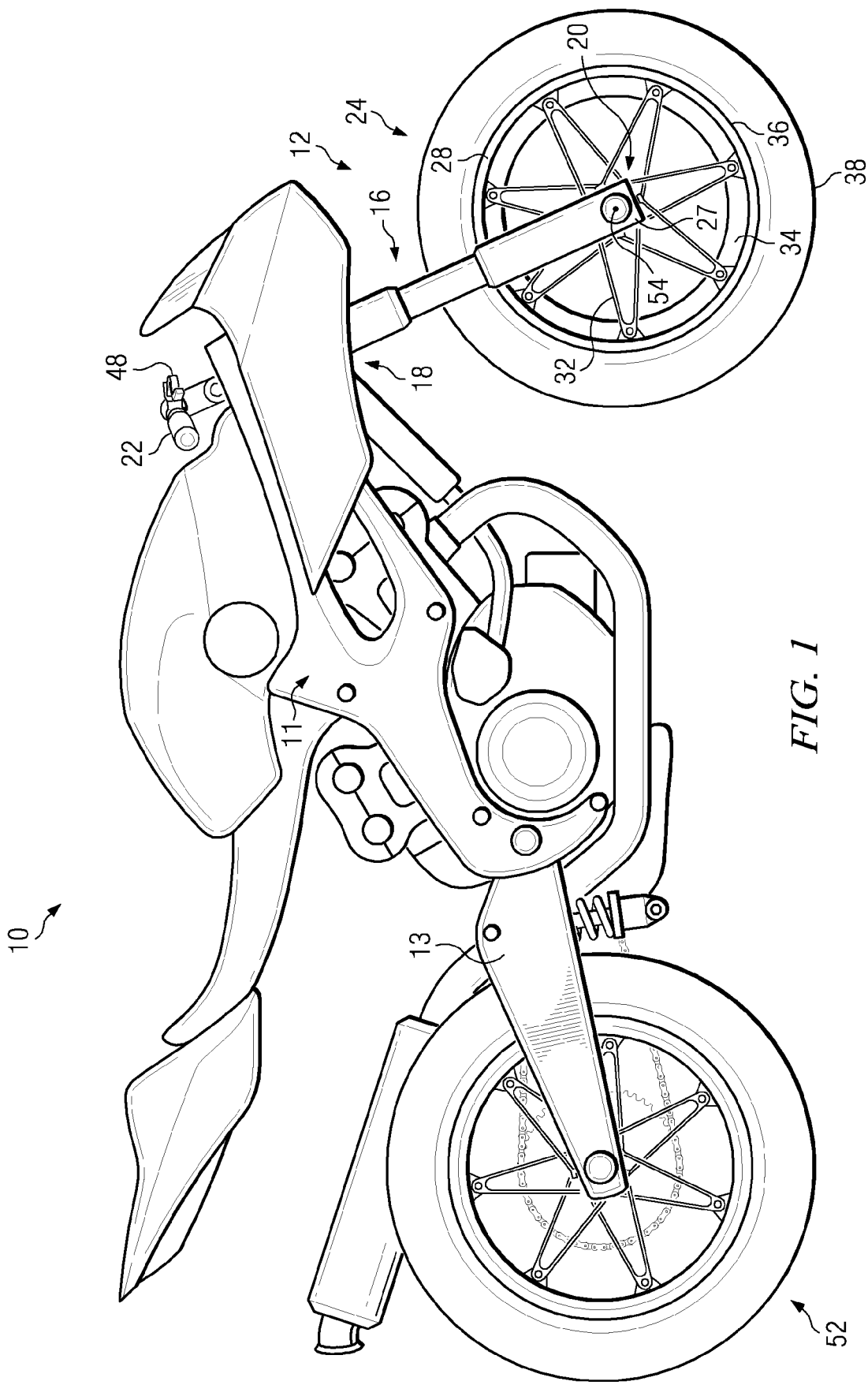
FIG. 1 is a right side elevational view depicting a motorcycle in accordance with one embodiment.

Embodiments are hereinafter described in detail in connection with the views and examples of FIGS. 1-4, wherein like numbers indicate the same or corresponding elements throughout the views. A motorcycle in accordance with one embodiment can include a frame and one or more wheel support members attached to the frame. For example, as shown in FIG. 1, a motorcycle 10 is shown to include a frame 11 and multiple wheel support members including, for example, a front fork assembly 12 and a rear swing arm 13. A front wheel 24 can be rotatably attached to the front fork assembly 12 and a rear wheel 52 can be rotatably attached to the rear swing arm 13. The front fork assembly 12 is shown to be pivotally attached to the frame 11 adjacent to a front end of the frame 11. The rear swing arm 13 is shown to be pivotally attached to the frame 11 adjacent to a rear end of the frame 11. However, it will be appreciated that a front fork assembly and/or a rear swing arm can be supported with respect to a motorcycle's frame in any of a variety of other configurations in accordance with alternative embodiments.

In one embodiment, as shown in FIGS. 1-4, the front fork assembly 12 can extend from an upper end 18 to a lower end 20 and can include left and right fork members 14 and 16. In one embodiment, as shown in the embodiment of FIGS. 1-4, the left fork member 14 can be spaced from the right fork member 16 in a corresponding and mirroring relationship with respect to, and on opposite sides of, an imaginary vertical plane which bisects the motorcycle 10 along a longitudinal axis of the motorcycle 10 into left and right sides. A handlebar 22 can be attached to the front fork assembly 12 adjacent to the upper end 18 of the front fork assembly 12. The handlebar 22 can be pivotally attached or otherwise supported with respect to the frame 11 such that it can facilitate steering of the front fork assembly 12. An operator of the motorcycle 10 can accordingly use the handlebar 22 to facilitate pivoting of the front fork assembly 12 with respect to the frame 11 for steering of the motorcycle 10.

Figure 2:
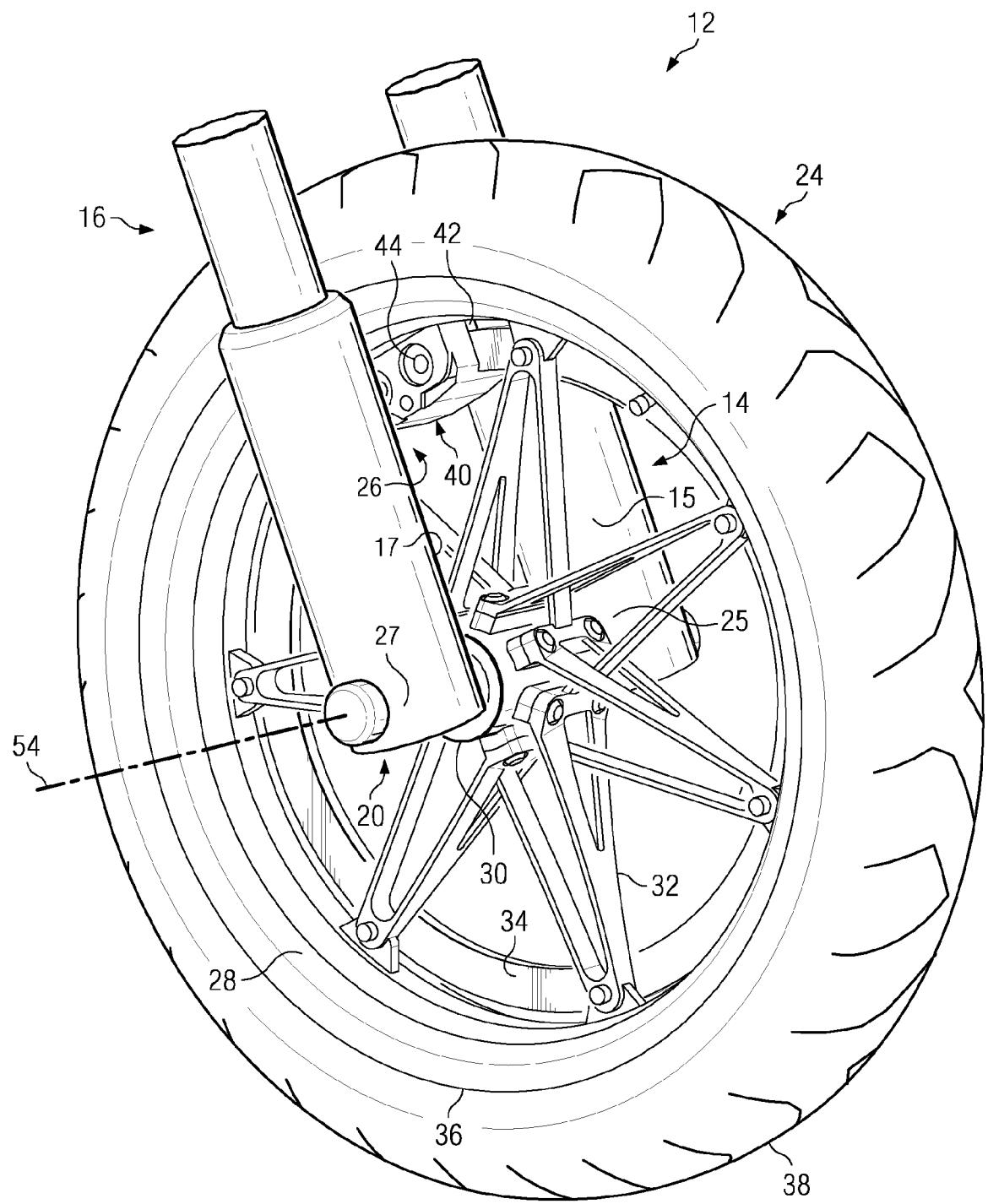
FIG. 2 is a right front perspective view depicting a portion of the motorcycle of FIG. 1.

The left fork member 14 is shown to comprise a left inner surface 15 and a left wheel mount portion 25. Likewise, the right fork member 16 can comprise a right inner surface 17 and a right wheel mount portion 27. In one embodiment, as shown in FIGS. 1-4, the left inner surface 15 faces the right inner surface 17 in a spaced relationship to create a channel 26 for receiving a portion of the front wheel 24 as shown in FIG. 2. The left and right wheel mount portions 25 and 27 are shown to be disposed adjacent to the lower end 20 of the front fork assembly 12. The front fork assembly 12 can be formed from any of a variety of materials including, for example, metal, plastic, fiberglass, carbon-fiber, composites, and/or any of a variety of other materials or combinations thereof, and can have any of a variety of suitable shapes and configurations as will be appreciated. It will be appreciated that a front fork assembly can be provided in any of a variety of alternative configurations in accordance with other embodiments.

The front wheel 24 is shown to comprise a rim 28, a hub 30, and spokes (e.g., 32). The spokes (e.g., 32) can attach the hub 30 to the rim 28 and can be provided in any of a variety of configurations. Although the front wheel 24 is shown to include multiple spokes (e.g., 32), it will be appreciated that a wheel in accordance with another embodiment might only include a single spoke. The front wheel 24 can also include a tire 38 which is attached to the rim 28 about an outer periphery 36 of the rim 28.

A brake disc 34 is shown to comprise an annular brake ring which is attached to the rim 28 of the front wheel 24 at a location which is generally adjacent to the rim 28 of the front wheel 24. However, it will be appreciated that a motorcycle in accordance with another embodiment can include a brake disc having any of a variety of alternative sizes, shapes, and/or locations (e.g., more closely adjacent to a wheel's hub).

The front wheel 24 is shown to be rotatably attached to the front fork assembly 12 adjacent to the lower end 20 of the front fork assembly 12. In one particular embodiment, as shown in FIGS. 1-4, the hub 30 of front wheel 24 can be rotatably attached to each of the left and right wheel mount portions 25 and 27 of the front fork assembly 12 such that the front fork assembly 12 straddles the front wheel 24, and such that the left and right inner surfaces 15 and 17 of the left and right fork members 14 and 16 face the front wheel 24. In this configuration, the brake disc 34 is shown to be positioned between the spokes 32 and the left fork member 14.

A brake caliper 40 is shown to be positioned within the channel 26 to interact with the brake disc 34 of the front wheel 24. In one embodiment, with reference to FIGS. 2 and 4, the brake caliper 40 can be attached to the left inner surface 15 of the left fork member 14 at a location spaced from the left wheel mount portion 25 such that the brake caliper 40 resides entirely within the channel 26 and interacts with the brake disc 34. In this configuration, as shown in the embodiment of FIG. 1-4, the brake caliper 40 can be at least substantially concealed (i.e., substantially or entirely concealed) from view by the front fork assembly 12 when the motorcycle 10 is viewed in either direction from one of the left and right fork members 14 and 16 to the front wheel 24 along a rotational axis 54 of the front wheel 24. For example, the brake caliper 40 is shown to be entirely concealed from view by the right fork member 16 when the motorcycle 10 is viewed in a direction (as in FIG. 1) from the right fork member 16 to the front wheel 24 along the rotational axis 54 of the front wheel 24. As another example, the brake caliper 40 is shown to be entirely concealed from view by the left fork member 14 when the motorcycle 10 is viewed in a direction (as in FIG. 3) from the left fork member 14 to the front wheel 24 along the rotational axis 54 of the front wheel 24. It will be appreciated that concealment of the brake caliper 40 in this manner provides certain aesthetic advantages, such as, for example, reducing the appearance of bulk upon the motorcycle 10 and streamlining the overall appearance of the motorcycle 10.

A brake caliper can be attached to a wheel support member (e.g., a fork member) at any of a variety of suitable distances from the rotational axis of the wheel associated with that wheel support member. It will be appreciated, however, that this distance can be selected depending upon the type and configuration of brake disc which is associated with the wheel. For example, in the embodiment shown in FIG. 2, in which the brake disc 34 comprises an annular brake ring which is generally adjacent to the rim 28, it can be seen that portions of the rim 28 are spaced from the rotational axis 54 of the front wheel 24 by a distance which is generally equal to the distance from which the brake caliper 40 is spaced from the rotational axis 54. In this configuration, the brake caliper 40, the brake disc 34, and the rim 28 can all be generally evenly spaced from the rotational axis 54 of the front wheel 24. However, it will be appreciated that a brake caliper can be attached to a wheel support member in any of a variety of suitable alternative locations or configurations.

Figure 4:
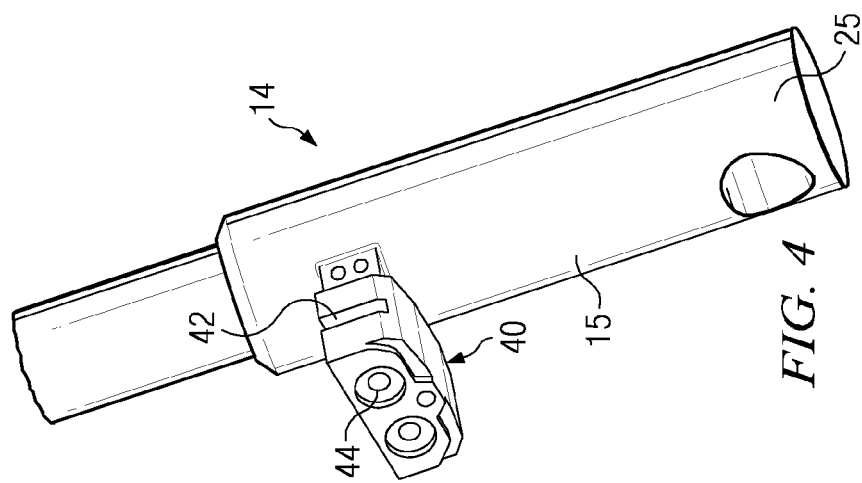
FIG. 4 is a right front perspective view depicting the brake caliper and the portion of the left fork member of FIG. 2 apart from the other components of FIG. 2.
Figure 3:
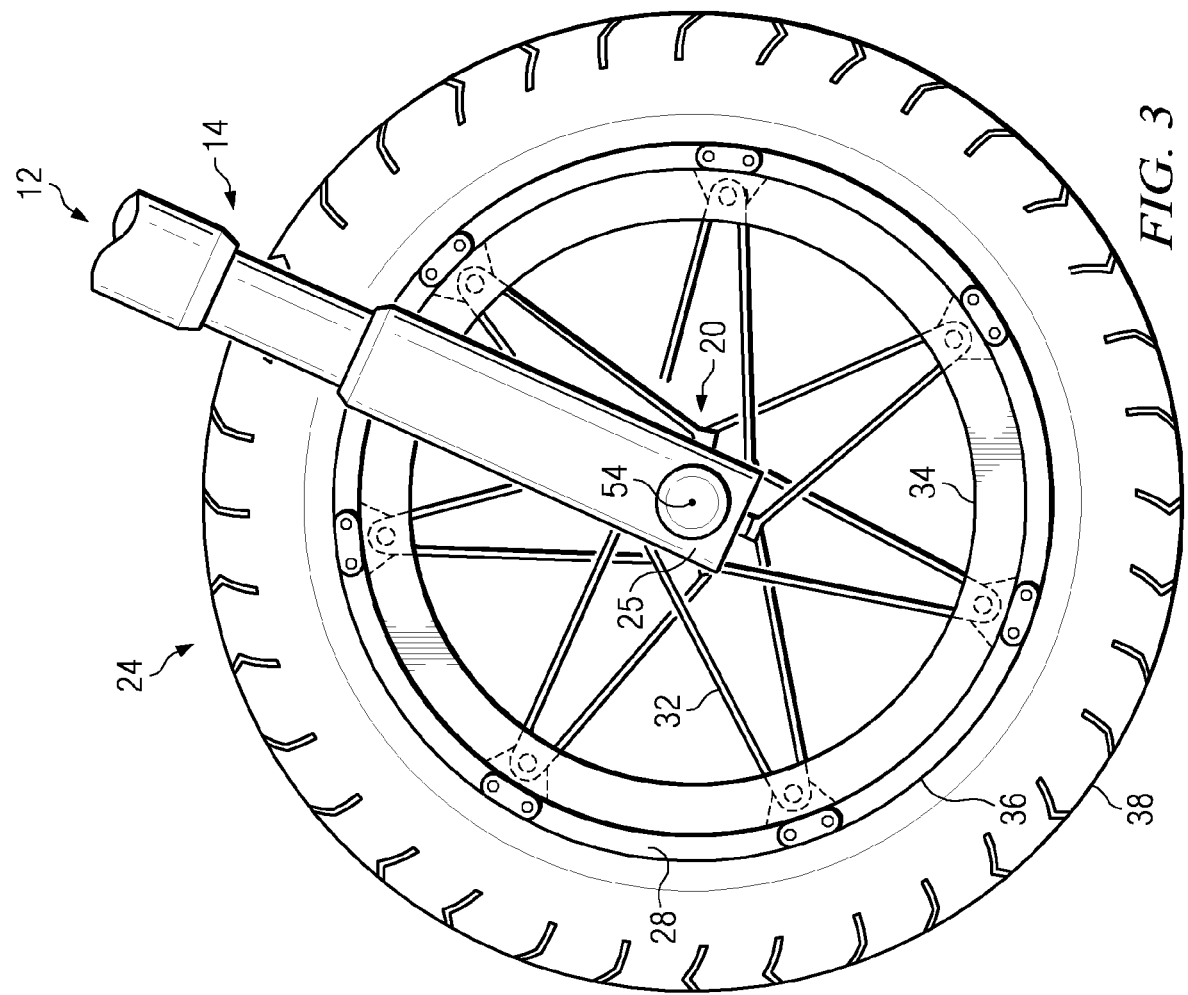
FIG. 3 is a left side elevational view depicting a portion of the motorcycle of FIG. 1.

In accordance with one embodiment, as shown in FIGS. 2 and 4, the brake caliper 40 can comprise at least one brake shoe 42 which is configured to selectively compress against the brake disc 34 to slow or stop rotation of the front wheel 24. In one embodiment, as shown in FIGS. 2 and 4, the brake caliper 40 can comprise a hydraulically-operated cylinder 44 which is coupled with the brake shoe 42 for selectively causing the brake shoe 42 to compress against the brake disc 34. In an alternative embodiment, a brake caliper can include a pneumatically-operated cylinder, an electromagnetic actuator, and/or some other mechanical linkage which is configured to cause a brake shoe to selectively interact with a brake disc to slow or stop rotation of a wheel.

A motorcycle in accordance with one embodiment can also include one or more brake control actuators. For example, as shown in FIG. 1, a hand lever 48 is shown to be attached to the handlebar 22 of the motorcycle 10. The hand lever 48 can be configured for use by an operator of the motorcycle 10 to control the brake caliper 40 for selectively slowing or stopping rotation of the front wheel 24. The hand lever 48 can additionally or alternatively be configured for use by an operator of the motorcycle 10 to control another brake caliper which can be associated with the rear wheel 52 for selectively slowing or stopping rotation of the rear wheel 52. In yet another embodiment, a brake control actuator may alternatively comprise any of a variety of alternative devices such as, for example, a foot pedal and/or an alternatively located hand lever.

It will be appreciated that a conduit may be connected to the brake caliper 40 to facilitate control of the brake caliper 40 by the brake control actuator (e.g., the hand lever 48). In one embodiment, the conduit can be configured for passage of brake fluid, hydraulic fluid, or air, for example. In another embodiment, the conduit can comprise one or more electrical wires which are configured to provide power and/or control signals to a brake caliper. In still another embodiment, the conduit can comprise a mechanical linkage such as, for example, a Bowden-type cable.

It will be appreciated that any portion of the conduit which is routed within the channel 26 (e.g., and may be attached and/or adjacent to the left inner surface 15 and/or the right inner surface 17) can be at least substantially concealed (i.e., substantially or entirely concealed) from view by the front fork assembly 12 such as when the motorcycle 10 is viewed in either direction from one of the left and right fork members 14 and 16 to the front wheel 24 along the rotational axis 54 of the front wheel 24. For example, any portion of a conduit leading to the brake caliper 40 and within the channel 26 can be entirely concealed from view by the right fork member 16 when the motorcycle 10 is viewed in a direction (as in FIG. 1) from the right fork member 16 to the front wheel 24 along the rotational axis 54 of the front wheel 24. Likewise, any such conduit portion can be entirely concealed from view by the left fork member 14 when the motorcycle 10 is viewed in a direction (as in FIG. 3) from the left fork member 14 to the front wheel 24 along the rotational axis 54 of the front wheel 24.

Although FIG. 1-4 depict the brake caliper 40 mounted to the left fork member 14 and the brake disc 34 mounted to the left side of the front wheel 24, it will be appreciated that a motorcycle in accordance with an alternative embodiment may additionally or alternatively include a brake caliper 20 attached to a right fork member and a brake disc provided upon a right side of a wheel (e.g., a front wheel). It will also be appreciated that a motorcycle in accordance with an alternative embodiment may alternatively or additionally include a brake caliper which is associated with a rear wheel of the motorcycle. For example, a brake caliper for the rear wheel 52 of the motorcycle 10 might be attached to the rear swing arm 13 for interaction with a brake disc (not shown) associated with the rear wheel 52. Such a motorcycle can be configured such that no portion of the brake caliper is visible when the motorcycle is viewed in either direction from the left and/or right sides along a rotational axis of the rear wheel 52 (e.g., such as when the brake caliper is obscured by the rear swing arm 13).

In one embodiment, a brake caliper can be attached to a portion of a telescoping front fork assembly of a motorcycle. A telescoping front fork assembly can include fork members which are telescopingly received within other adjacent fork members. In such an arrangement, bumps and other impacts to the front wheel can be absorbed by telescoping movement of certain fork members into other fork members. This telescoping movement can therefore dampen passage to the frame of such bumps or impacts, and thus the operator, of the motorcycle. It will be appreciated that, if a brake caliper as described herein is provided for attachment to a telescoping front fork assembly, the brake caliper can be attached to a portion of the telescoping fork assembly which does not move inwardly and outwardly with respect to the rotational axis of the front wheel during operation of the motorcycle (see, for example, the embodiment of FIG. 2). Such a configuration can help to ensure that the brake caliper can consistently interface a brake disc attached to a corresponding wheel regardless of whether the telescoping front fork assembly is in a compressed or relaxed state, thereby resulting in effective and predictable braking capability of the brake caliper during all operations of the motorcycle. In an alternative embodiment, a brake caliper can be attached to a portion of a non-telescoping front fork assembly of a motorcycle.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising:
   a frame;
   a front fork assembly supported with respect to the frame and including a first fork member and a second fork member, wherein the first fork member comprises a first inner surface and a first wheel mount portion, the second fork member comprises a second inner surface and a second wheel mount portion, and the first inner surface faces the second inner surface in a spaced relationship to create a channel;
   a front wheel comprising a hub and a rim attached to the hub, wherein the hub is rotatably attached to each of the first and second wheel mount portions such that the front fork assembly straddles the front wheel; and
   a brake caliper positioned entirely within the channel, wherein the brake caliper is entirely concealed from view by the front fork assembly when the motorcycle is viewed in either direction from one of the first and second fork members to the front wheel along a rotational axis of the front wheel.

2. The motorcycle of claim 1 further comprising a brake control actuator configured to facilitate control of the brake caliper.

3. The motorcycle of claim 2 further comprising a handlebar attached to the front fork assembly, wherein the brake control actuator comprises a hand lever attached to the handlebar.

4. The motorcycle of claim 2 wherein the brake caliper comprises a hydraulically-operated cylinder coupled with a brake shoe.

5. The motorcycle of claim 1 wherein the brake caliper is attached to the first inner surface of the first fork member at a location spaced from the first wheel mount portion.

6. The motorcycle of claim 1 wherein the first fork member comprises a left fork member.

7. The motorcycle of claim 1 wherein portions of the rim are spaced from the rotational axis of the front wheel by a first distance, portions of the brake caliper are spaced from the rotational axis of the front wheel by a second distance, and the first distance is generally equal to the second distance.

8. The motorcycle of claim 1 wherein the front wheel further comprises a tire attached to the rim about an outer periphery of the rim.

9. A motorcycle comprising:
   a frame;
   a front fork assembly supported with respect to the frame and including a first fork member and a second fork member, wherein the first fork member comprises a first inner surface and a first wheel mount portion, the second fork member comprises a second inner surface and a second wheel mount portion, and the first inner surface faces the second inner surface in a spaced relationship to create a channel;
   a front wheel comprising a hub, a rim, and a tire, wherein the rim is attached to the hub, the tire is attached to the rim about an outer periphery of the rim, and the hub is rotatably attached to each of the first and second wheel mount portions such that the front fork assembly straddles the front wheel; and a brake caliper attached to the first inner surface of the first fork member at a location spaced from the first wheel mount portion such that the brake caliper resides entirely within the channel, wherein the brake caliper is concealed from view by the front fork assembly when the motorcycle is viewed in either direction from one of the first and second fork members to the front wheel along a rotational axis of the front wheel, portions of the rim are spaced from the rotational axis of the front wheel by a first distance, portions of the brake caliper are spaced from the rotational axis of the front wheel by a second distance, and the first distance is generally equal to the second distance;

a handlebar supported with respect to the frame and configured to facilitate steering of the front fork assembly by an operator; and a hand lever attached to the handlebar and configured for use by an operator to control the brake caliper.

10. The motorcycle of claim 9 wherein the brake caliper comprises a hydraulically-operated cylinder coupled with said brake shoe.

11. The motorcycle of claim 5 wherein the brake caliper is attached to the first inner surface with fasteners, and wherein the fasteners are not visible when the motorcycle is viewed in either direction from one of the first and second fork members to the front wheel along the rotational axis of the front wheel.

12. The motorcycle of claim 9 wherein the brake caliper is attached to the first inner surface with fasteners, and wherein the fasteners are not visible when the motorcycle is viewed in either direction from one of the first and second fork members to the front wheel along the rotational axis of the front wheel.

* * * * *

UNITED STATES PATENT AND TRADEMARK OFFICE
CERTIFICATE OF CORRECTION

| | | |
|---|---|---|
| PATENT NO. | : 7,854,286 B2 | Page 1 of 1 |
| APPLICATION NO. | : 12/254874 | |
| DATED | : December 21, 2010 | |
| INVENTOR(S) | : Nagao et al. | |

It is certified that error appears in the above-identified patent and that said Letters Patent is hereby corrected as shown below:

Column 1, line 62, change "alone" to --along--.

Column 3, line 56, change "FIG." to --FIGS.--.

Column 5, line 16, change "FIG." to --FIGS.--.

Signed and Sealed this
Twenty-sixth Day of April, 2011

David J. Kappos
*Director of the United States Patent and Trademark Office*